United States Patent [19]

Murata et al.

[11] Patent Number: 5,797,825
[45] Date of Patent: Aug. 25, 1998

[54] TOOL CONVEYER

[75] Inventors: Atsuya Murata, Kasugai; Yukio Taki, Aichi-ken, both of Japan

[73] Assignee: Ohkuma Corporation, Aichi-ken, Japan

[21] Appl. No.: 842,848

[22] Filed: Apr. 17, 1997

[30] Foreign Application Priority Data

Apr. 18, 1996 [JP] Japan .................. 8-096914

[51] Int. Cl.⁶ ........................... B23Q 3/157
[52] U.S. Cl. ........................ 483/53; 483/51
[58] Field of Search .............. 483/36, 37, 38, 483/40, 41, 44, 46, 48, 49, 51, 65, 53, 8, 31

[56] References Cited

U.S. PATENT DOCUMENTS

| | | | |
|---|---|---|---|
| 3,161,951 | 12/1964 | Anthony | 483/40 |
| 3,689,989 | 9/1972 | Jerue | 483/8 |
| 3,789,472 | 2/1974 | Pegard | 483/37 |
| 3,822,466 | 7/1974 | Noguchi et al. | 483/46 |
| 4,837,919 | 6/1989 | Hoppe | 483/38 |
| 4,890,969 | 1/1990 | Esser | 483/37 |

FOREIGN PATENT DOCUMENTS

| | | | |
|---|---|---|---|
| 640433 | 3/1995 | European Pat. Off. | 483/38 |
| 237807 | 7/1986 | Germany | 483/53 |
| 137538 | 8/1983 | Japan | 483/51 |
| 2-109646 | 4/1990 | Japan | |
| 4-129637 | 4/1992 | Japan | |
| 4-141338 | 5/1992 | Japan | |
| 2122118 | 1/1984 | United Kingdom | 483/51 |

*Primary Examiner*—William R. Briggs
*Attorney, Agent, or Firm*—Lahive & Cockfield, LLP

[57] ABSTRACT

A tool conveyer for use with a machine tool includes: a rotatable first link (15); a first fluid pressure cylinder (17) for driving the first link: a second link (20) rotatably connected at its intermediate portion to an free end of the first link; a tool holder (11) connected to a first end of the second link; a first guide (23) for rectilinearly guiding the tool holder in a tool conveying direction; and a second guide (24) for a second end of the second link in a direction perpendicular to the first guide. When the second link is rotated by the first fluid pressure cylinder via the first link, the tool holder is rectilinearly transferred between a tool magazine and an automatic tool changer. The tool conveyer further includes first, second, and third gears (26, 27, 28); a second fluid pressure cylinder (29) for driving the first gear; and a catch (11a) provided on the tool holder for booking a pot (4) and a tool (3). The second fluid pressure cylinder is actuated to rotate the shaft (21) via the first to third gears to pivot the pot (4) 90 degrees to the tool conveying direction.

10 Claims, 5 Drawing Sheets

TOOL CONVEYER

BACKGROUND OF THE INVENTION

1. Field of the Invention

The present invention relates to a tool conveyer for use with a machine tool for carrying a tool between a tool magazine and an automatic tool changer.

2. Description of the Prior Art

In one conventional tool changing system for use with a machine tool, a chain or drum of a tool magazine is rotated to transfer a desired tool to the tool changing position. In another known system in the art, a desired tool is pulled out of a fixed tool magazine and carried to an automatic tool changer by means of a chain.

These systems suffer from common disadvantages: as a chain is used in either system, a large torque is required at both the beginning and in the end of tool conveyance which reduces the transfer speed; also, a complicated mechanism is required to stop the chain in a predetermined position. Thus, there have been long-felt needs for providing an improved tool changing system.

SUMMARY OF THE INVENTION

In view of the above-identified problems, it is an object of the present invention to provide a tool conveyer that can transfer tools smoothly to a machine tool at a high speed.

It is another object of the present invention to provide a simply-structured, rapid tool conveyer for use with a machine tool.

The above object and other related objects are realized by providing a tool conveyer for use with a machine tool for carrying a tool between a tool magazine and an automatic tool changer. The tool conveyer includes a case having a shaft provided thereon; a first link rotatably connected at a first end to the shaft; first means for driving the first link; a second link rotatably connected at its intermediate portion to a second end of the first link; a tool holder connected to a first end of the second link; a first guide for rectilinearly guiding the tool holder in a tool conveying direction; and a second guide for rectilinearly guiding a second end of the second link in a direction perpendicular to the first guide.

According to one aspect of the present invention, the tool conveyer further includes a mechanism for pivoting the tool right angle to the tool conveying direction in a position close to the automatic tool changer. The mechanism includes first, second, and third gears each having the same number of teeth and second means for driving one of the three gears. The three gears are sequentially in mesh with each other. The first gear is connected to a second end of the second link, the second gear is connected to the intermediate portion of the second link, and the third gear is connected to the first end of the second link. Furthermore, the tool holder includes a catch for hooking the tool, the catch being integrally rotatable with the third gear.

According to another aspect of the present invention, the second means is a fluid pressure cylinder connected to the first gear via a connection means.

According to still another aspect of the present invention, the tool conveyer further includes a fourth gear provided on the shaft, and the first means is a fluid pressure cylinder having a slidable rack which is in mesh with the fourth gear. The fluid pressure cylinder can rotate the fourth gear 180 degrees so as to rectilinearly transfer the tool holder between the tool magazine and the automatic tool changer.

According to yet another aspect of the present invention, the tool conveying direction is perpendicular to the axis of a main shaft of the machine tool.

In carrying out the invention in one preferred mode, the tool holder pulls the tool out of the tool magazine in parallel to the tool conveying direction and perpendicularly to the main shaft of the machine tool.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

A preferred embodiment of the present invention will be explained with reference to the attached drawings.

Figure 1:
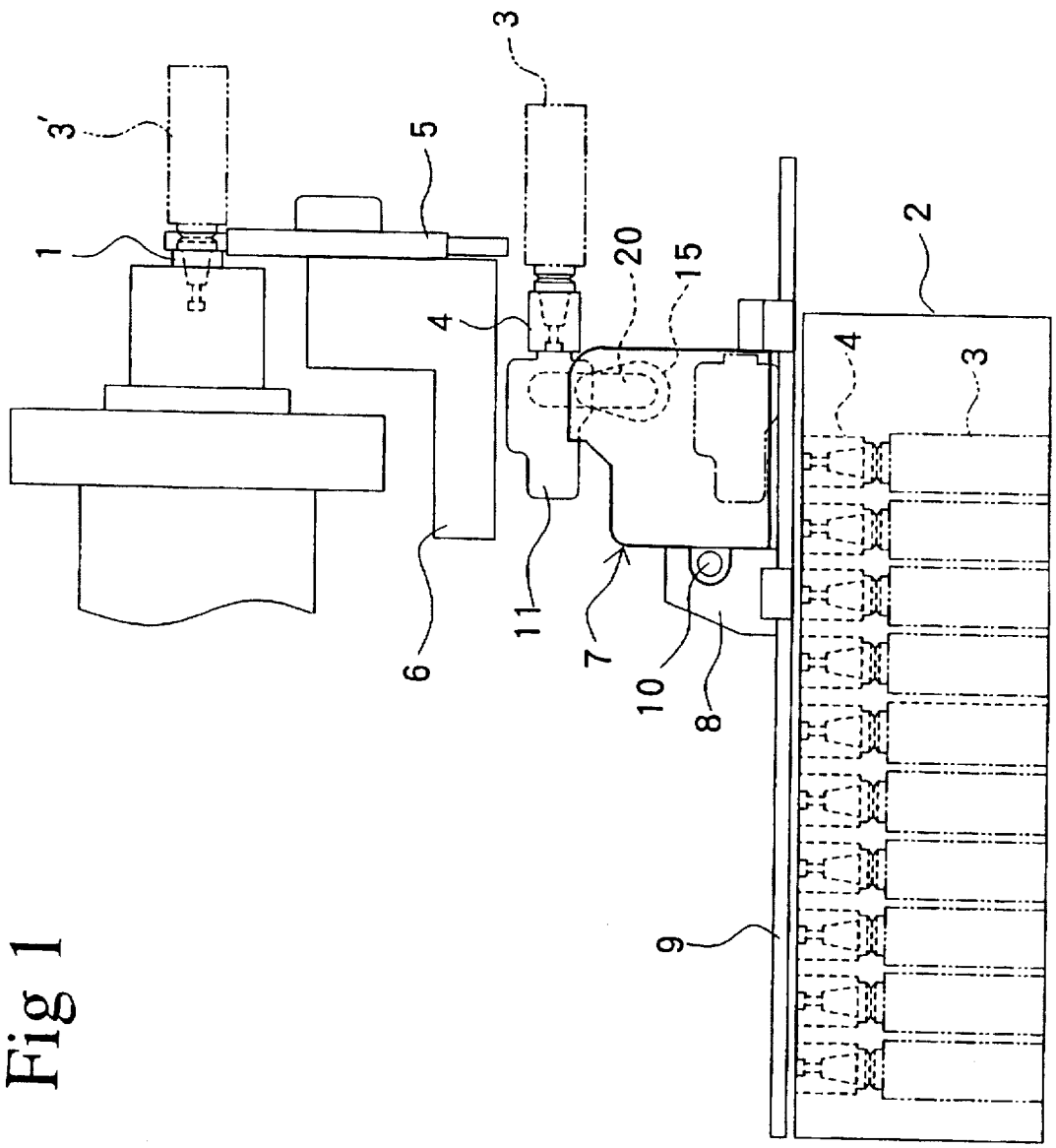
FIG. 1 is a top plan view of a machine tool of a preferred embodiment in accordance with the present invention.

Referring to FIG. 1, reference numeral 1 designates a main shaft 1 of the machine tool. Reference numeral 2 designates a tool magazine disposed in parallel to the main shaft 1. Numerous tools 3 and pots 4 are stored in the tool magazine 2 such that they can be pulled out perpendicularly to the axis of the main shaft 1. Provided between the main shaft 1 and the tool magazine 2 are an automatic tool changer 6 with a pivotal tool change arm 5 and a tool conveyer 7 for transferring a tool 3 between the tool magazine 2 and the automatic tool changer 6. The tool conveyer 7 is horizontally movable on rails 9 via a slider 8 and also supported by a feed shaft 10 so as to be vertically movable with respect to the slider 8. Provided in the tool conveyer 7 is a tool holder 11 which can reciprocate in the direction perpendicular to the axis of the main shaft 1 while holding one of the tools 3 and its pot 4.

Figure 2:
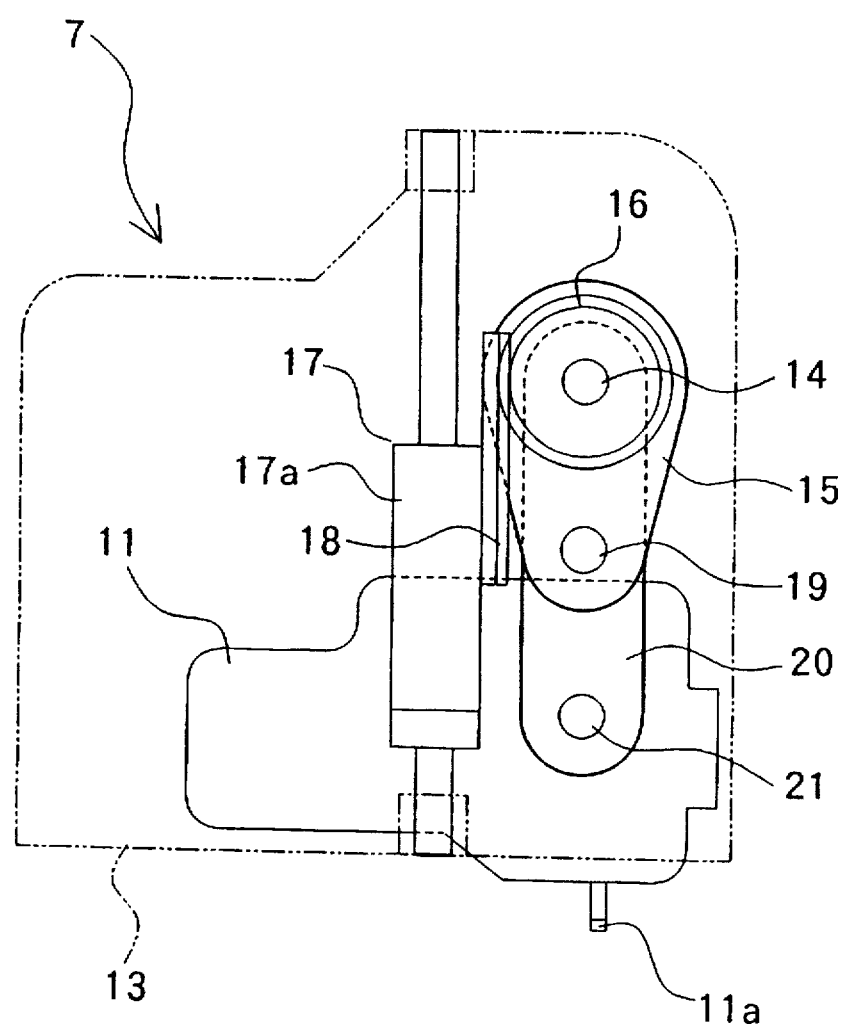
FIG. 2 is an enlarged top plan view of the tool conveyer of the machine tool shown in FIG. 1.
Figure 3:
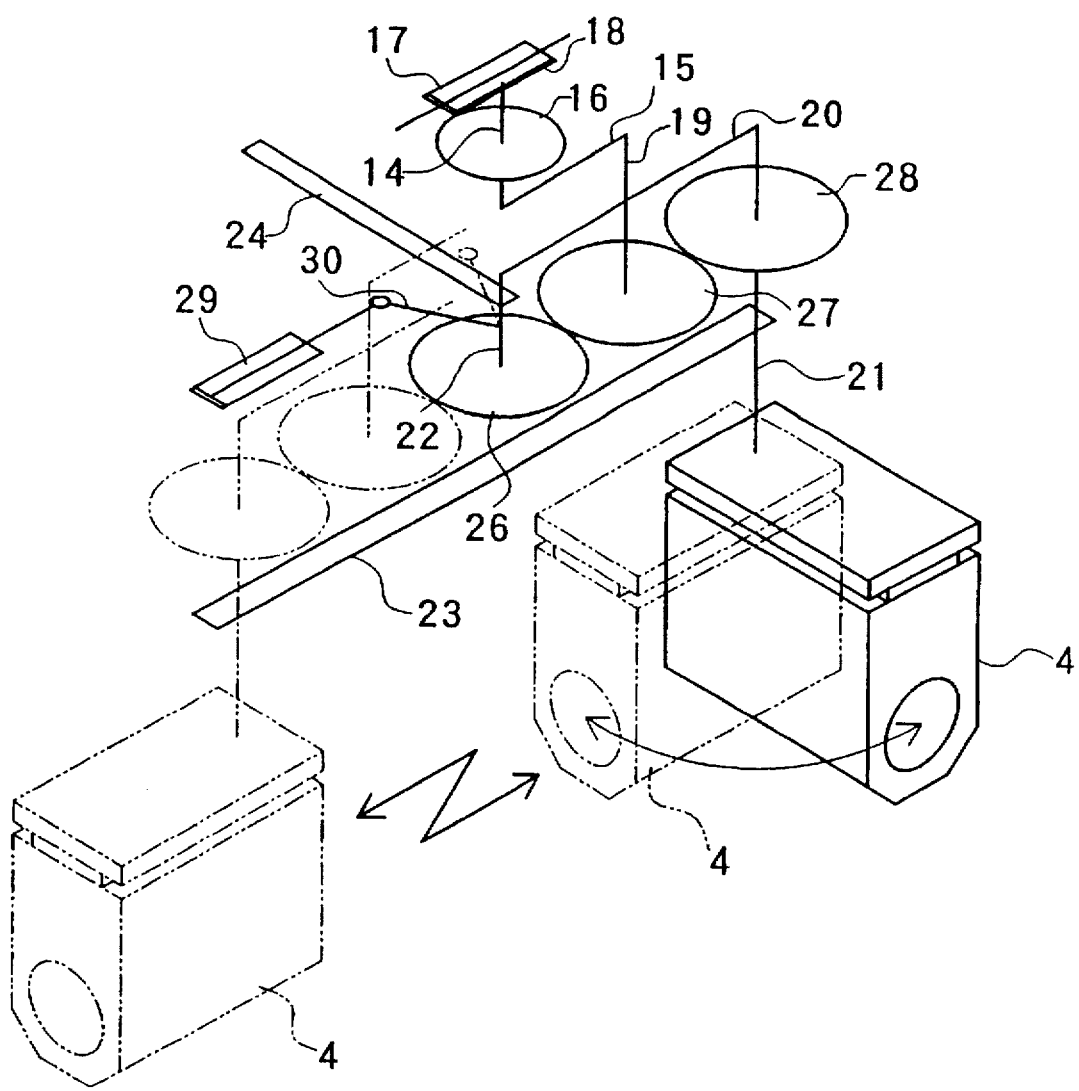
FIG. 3 is a schematic view in perspective of the link and gear mechanisms of the tool conveyer shown in FIG. 1.

With reference to FIGS. 2 and 3, the tool conveyer 7 includes a case 13 which has a first shaft 14 provided thereon. Also, a first link 15 is rotatably supported at one end on the first shaft 14 in the tool conveyer 7. The first shaft 14 has a gear 16 provided therearound. The gear 16 meshes with a rack 18 provided on a slidable member 17a of a first fluid pressure cylinder 17. A second link 20 is rotatably connected at its intermediate portion to the free end of the first link 15 via a second shaft 19. The tool holder 11 is rotatably connected to one end of the second link 20 via a third shaft 21. A fourth shaft 22 is provided on the other end of the second link 20. Furthermore, the tool holder 11 includes a catch 11a for hooking a pot 4. The catch 11a is provided so as to be pivotal on the third shaft 21. Also provided on the case 13 are a first guide 23 for rectilinearly guiding the shaft 21 of the tool holder 11 in the tool conveyance direction and a second guide 24 for rectilinearly guiding the shaft 22 of the second link 20 in the direction perpendicular to the first guide 23.

The tool conveyer 7 of this embodiment is also provided with a mechanism for pivoting the tool 3 right angle to the tool conveyance direction when the tool is positioned close to the automatic tool changer 6. The pivoting mechanism includes first to third gears 26–28 which mesh with each other and have the same number of gear teeth. The mechanism further includes a second fluid pressure cylinder 29 for driving the first gear 26. The first gear 26 is provided on the shaft 22 of the second link 20 and is connected to the second fluid pressure cylinder 29 via a lever 30. The second gear 27 is provided on the shaft 19 of the second link 20. The third gear 28 is provided on the shaft 21 of the second link 20 so as to be integrally rotatable with the catch 11a of the tool holder 11.

Figure 4:
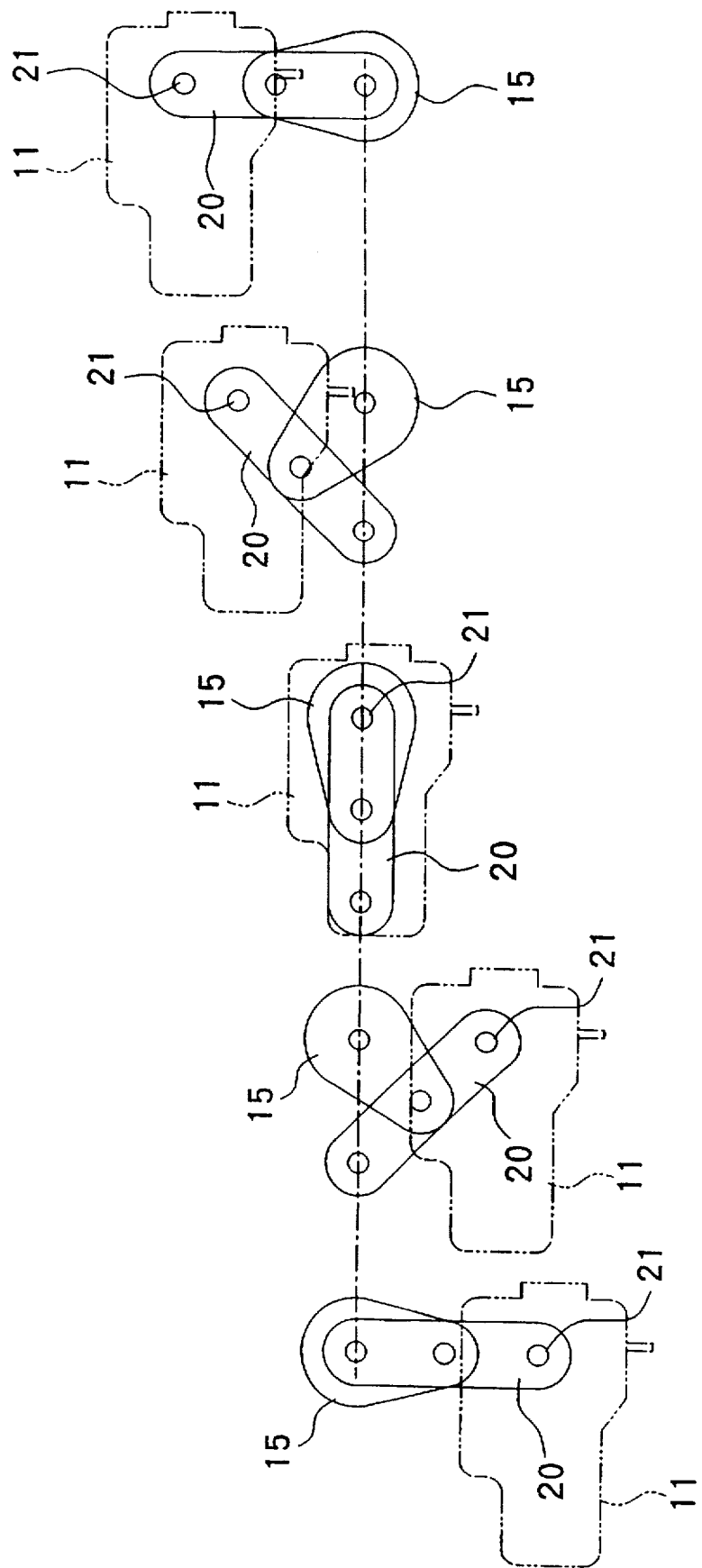
FIG. 4 is a diagram that sequentially illustrates the operation of the link mechanism shown in FIG. 3.

The operation of the tool conveyer 7 is explained hereinafter with reference to the drawings. As shown FIG. 2, when the first fluid pressure cylinder 17 is actuated with the tool bolder 11 positioned on the tool magazine side, the slidable member 17a of the cylinder 17 rotates the first link 15 in the clockwise direction via the rack 18 and the gear 16. As shown in FIG. 3, the clockwise rotation or the first link 15 causes the shafts 21 and 22 on the two opposite ends of the second link 20 to be guided in two directions perpendicular to each other along the first and second guides 23 and 24, respectively. This in turn causes the second link 20 to shift in the sequence shown in FIG. 4. Concurrently, the rectilinear motion of the shaft 21 causes the tool holder 11 to be transferred to a position close to the automatic tool changer 6 in the direction perpendicular to the axis of the main shaft. Also concurrently, the catch 11a hooks and pulls the pot 4 and the tool 3 out of the tool magazine 2.

Figure 5:
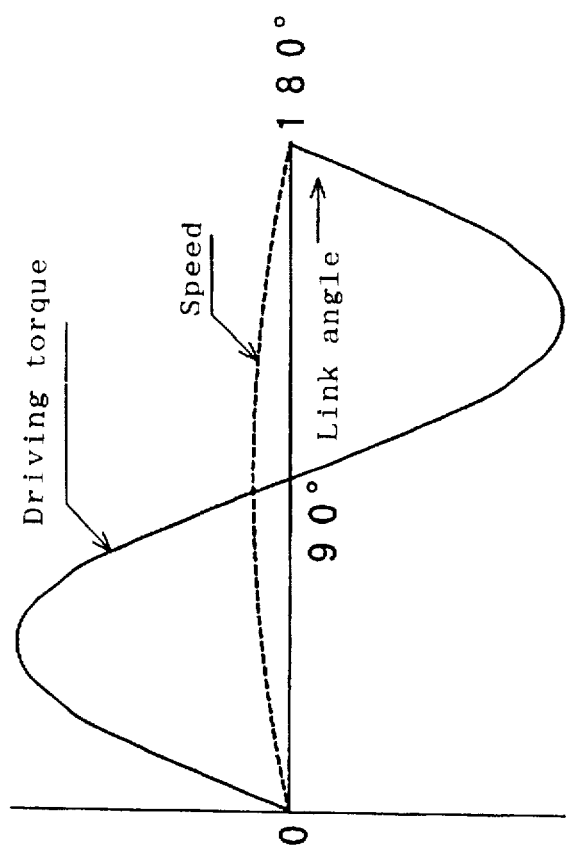
FIG. 5 is a torque chart of the link mechanism of the embodiment.

As the tool holder 11 is driven by the first fluid pressure cylinder 17 via the first and second links 15 and 20, only a small torque is required for rotating the gear 16 during the acceleration and deceleration of the tool holder 11 at the beginning and in the end of the tool conveyance operation. Therefore, the tool 3 is conveyed at a high speed as shown in FIG. 5. Furthermore, the dead centers of the first link 15 correspond to the stroke ends of the tool holder 11. Therefore, the tool conveyer 7 can smoothly and accurately stop the tool 3 in the tool magazine side and tool changer side positions without providing any stoppers. The tool conveyance distance can also be freely changed by changing the lengths of the links 15 and 20 without adjusting the stroke of the first fluid pressure cylinder 17, thereby making it easier to handle long tools.

When the tool 3 is transferred to the position close to the automatic tool changer 6 (the tool changer side position) as shown in FIG. 3, the second fluid pressure cylinder 29 is actuated to rotate the first gear 26 via the lever 30, which in turn rotates the second and third gears 27 and 28. Subsequently, the catch la is also rotated together with the third gear 28 as they are both connected to the common shaft, thus pivoting the pot 4 and the tool 3 right angle to the tool conveying direction or to the direction parallel to the axis of the main shaft 1 as best shown in FIG. 1. In this position, the tool 3 is taken out of the pot 4 and set in the tool change arm 5 by a shifter (not shown). Then, the currently attached tool 3' is replaced with the new tool 3 by a changing motion known in the art. The tool 3' is set in the pot 4 of the tool conveyer 7 via the tool change arm 5 and the shifter, and then in the tool magazine 2 in reverse order.

As is clearly shown in the above explanation, the tool conveyer 7 of the embodiment can transfer the tool 3 in two motions, i.e., a rectilinear motion and a pivotal motion, thereby minimizing the conveying distance of the tool 3 and reducing the size of the tool conveyer 7 itself. Furthermore, this also shortens the distance between the main shaft 1 and the tool magazine 2, which contributes to the overall size reduction of the machine tool.

While the tool 3 is transferred, the first gear 26, prevented from rotating by the second fluid pressure cylinder 29, functions as a sun gear with the second gear 27 functioning as a planetary gear. As the second link 20 rotates, the second gear 27 revolves around the first gear 26 one hundred and eighty degrees. Since the first to third gears 26–28 have the same number or teeth, the third gear 28 shifts while maintaining the same phase so as not to rotate the shaft 21. Therefore, the pot 4 and the tool 3 can be transferred in parallel with the first guide 23 despite the rotation of the second link 20.

Although the tool 3 is transferred with the pot 4 in the foregoing embodiment, the tool conveyer 7 may be modified to transfer the tool 3 only. Furthermore, the first and second fluid pressure cylinders 17 and 29 can be replaced with some other type of device, such as electric motors, as a means of driving the first link 15 and the first gear 26, respectively.

As there may be many other modifications, alterations, and changes without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A tool conveyer for use with a machine tool for carrying a tool between a tool magazine and an automatic tool changer, said tool conveyer comprising a case having a shaft provided thereon, a first link rotatably connected at a first end to said shaft, first means for driving said first link, a second link rotatably connected at its intermediate portion to a second end of said first link, a tool holder connected to a first end of said second link, a first guide for rectilinearly guiding said tool holder in a tool conveying direction, and a second guide for rectilinearly guiding a second end of said second link in a direction perpendicular to said tool conveying direction.

2. The tool conveyer according to claim 1 further comprising a mechanism for pivoting said tool to be at a right angle relative to said tool conveying direction when said tool is in a position close to said automatic tool changer, said mechanism including first, second, and third gears each having the same number of teeth, said three gears meshing, wherein said first gear is connected to a second end of said second link, said second gear is connected to said intermediate portion of said second link, and said third gear is connected to said first end of said second link, and second means for driving one of said three gears, wherein said tool holder includes a catch for hooking said tool, said catch being integrally rotatable with said third gear.

3. The tool conveyer according to claim 2 wherein said second means includes a fluid pressure cylinder and means for connecing said first gear thereto.

4. The tool conveyer according to claim 1 further comprising a fourth gear provided on said shaft, wherein said first means includes a fluid pressure cylinder having a slidable rack which is in mesh with said fourth gear, for rotating said fourth gear 180 degrees so as to rectilinearly transfer said tool holder between said tool magazine and said automatic tool changer.

5. The tool conveyer according to claim 1 wherein said tool conveying direction is perpendicular to the axis of a main shaft of said machine tool.

6. The tool conveyer according to claim 1 wherein said tool holder pulls said tool out of said tool magazine in parallel to said tool conveying direction and perpendicularly to said main shaft of said machine tool.

7. The tool conveyer according to claim 2 further comprising a fourth gear provided on said shaft, wherein said first means includes a fluid pressure cylinder having a slidable rack which is in mesh with said fourth gear, for rotating said fourth gear 180 degrees so as to rectilinearly transfer said tool holder between said tool magazine and said automatic tool changer.

8. The tool conveyer according to claim 3 further comprising a fourth gear provided on said shaft, wherein said first means includes a fluid pressure cylinder having a slidable rack which is in mesh with said fourth gear, for rotating said fourth gear 180 degrees so as to rectilinearly transfer said tool holder between said tool magazine and said automatic tool changer.

9. The tool conveyer according to claim 2 wherein said tool conveying direction is perpendicular to the axis of a main shaft of said machine tool.

10. The tool conveyer according to claim 3 wherein said tool conveying direction is perpendicular to the axis of a main shaft of said machine tool.

* * * * *